United States Patent
Suk

(10) Patent No.: US 6,707,803 B1
(45) Date of Patent: Mar. 16, 2004

(54) DEVICE AND METHOD FOR PERFORMING INTER-MSC SOFT HANDOFF USING ROUTER IN CDMA COMMUNICATION SYSTEM

(75) Inventor: Su-Hwan Suk, Uiwang-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/525,250

(22) Filed: Mar. 15, 2000

(30) Foreign Application Priority Data

Mar. 15, 1999 (KR) .......................................... 1999-8561

(51) Int. Cl.[7] ................................................ H04Q 7/00
(52) U.S. Cl. ........................ 370/331; 455/436; 455/442
(58) Field of Search ................................ 370/331, 320, 370/335, 342, 332; 455/442, 436–441, 443–444

(56) References Cited

U.S. PATENT DOCUMENTS

| | | | | |
|---|---|---|---|---|
| 5,018,187 A | * | 5/1991 | Marinho et al. | 455/436 |
| 5,101,501 A | * | 3/1992 | Gilhousen et al. | 370/332 |
| 5,737,704 A | * | 4/1998 | Jin et al. | 455/450 |
| 5,848,063 A | * | 12/1998 | Weaver et al. | 455/436 |
| 6,075,990 A | * | 6/2000 | Shin | 455/436 |
| 6,141,554 A | * | 10/2000 | Choi | 455/436 |
| 6,304,755 B1 | * | 10/2001 | Tiedemann et al. | 455/437 |
| 6,370,127 B1 | * | 4/2002 | Daraiseh et al. | 370/342 |
| 6,421,539 B1 | * | 7/2002 | Jeong | 455/442 |
| 6,438,378 B1 | * | 8/2002 | Kouno | 455/437 |
| 6,603,751 B1 | * | 8/2003 | Odenwalder | 455/436 |

* cited by examiner

Primary Examiner—Salvatore Cangialosi
(74) Attorney, Agent, or Firm—Cha & Reiter, L.L.C.

(57) ABSTRACT

A device for performing an IMSHO using a router in a CDMA communication system is disclosed. The device comprises a router module allocated to each mobile switching center in the CDMA system, the router module for interfacing with a global communication interconnection network (GCIN); a base station subsystem (BSS) provided in each mobile switching center connected to the router module includes the GCIN; a base station modulator connected to the GCIN in the BSS for providing a link configuration information of the router module; and, a trunk for connecting the router modules of different mobile switching centers to enable the communication between the base station subsystems belonging to different mobile switching centers.

16 Claims, 3 Drawing Sheets

DEVICE AND METHOD FOR PERFORMING INTER-MSC SOFT HANDOFF USING ROUTER IN CDMA COMMUNICATION SYSTEM

CLAIM OF PRIORITY

This application claims priority to an application entitled "Device and Method for Performing Inter-MSC Soft Handoff Using Router in CDMA Communication System" filed in the Korean Industrial Property Office on Mar. 15, 1999 and assigned Ser. No. 99-8561.

BACKGROUND OF THE INVENTION

1. Field of the Invention

The present invention relates generally to a device and method for performing an inter-MSC (Mobile Switching Center) soft hand-off using a router in a CDMA communication system, and in particular, to a device and method for performing a soft hand-off between the cells, each belonging to different mobile switching centers, using a router in a CDMA communication system.

2. Description of the Related Art

In a CDMA (Code Division Multiple Access) system, when a mobile station (MS) travels from one cell area to the adjacent cell area during a call connection, the base station controller (BSC) of an anchor side determines whether to perform a hand-off based on the pilot strength measurement message (PSMM) received from a mobile station (MS). When the hand-off is required, the base station controller performs a hard-hand-off.

To this end, a vocoder of the anchor side releases the communication path, and the base station controller of a new cell allocates a new vocoder to set another communication path to complete the hand-off. In the process of switching to another vocoder, the mobile station experiences speech interruption in the communication channel. Moreover, the call drop rate in the hard hand-off is relatively higher than that of the soft hand-off.

SUMMARY OF THE INVENTION

It is, therefore, the object of the present invention to provide a device and method for performing a soft hand-off when a mobile station requires the hand-off while traveling from one cell to another cell, thereby preventing speech interruption due to the switching of the vocoder between the cells of a CDMA communication system.

To achieve the above object, there is provided a method for performing an inter-MSC (Mobile Switching Center) soft-hand-off (IMSHO) using a router in a code division multiple access (CDMA) communication system. The method includes the steps of transmitting a pilot strength measurement message (PSMM) from a mobile station (MS) of the anchor side to a transcoder & selector bank (TSB) of the anchor side; transmitting a hand-off request message from the TSB of the anchor side to a call control processor (CCP) of the anchor side; transmitting an IMSHO request message from the CCP of the anchor side to a CCP of the target side; transmitting a hand-off request message from the CCP of the target side to an BTS (Base station Transceiver System) control processor (BCP) of the target side; transmitting an TCE (Traffic Channel Element) allocation request message from the BCP of the target side to a channel element (CE) of the target side; transmitting a TCE allocation response message from the CE of the target side to a BCP of the target side; transmitting a hand-off allocation response message from the BCP of the target side to an CCP of the target side; transmitting an IMSHO allocation response message from the CCP of the target side to the CCP of the anchor side; transmitting a hand-off allocation response message from the CCP of the anchor side to the TSB of the anchor side; transmitting a soft hand-off operation message from the TSB of the anchor side to a CE of the anchor side; transmitting a response control message from the CE of the anchor side to the TSB of the anchor side; transmitting a time sync message from the TSB of the anchor side to the CE of the target side; transmitting the time sync message from the CE of the target side to the TSB of the anchor side; transmitting a time sync completion message from the CE of the target side to the BCP of the target side; transmitting a soft hand-off active message from the CE of the anchor side to the BCP of the anchor side; transmitting a hand-off direction message (HDM) from the TSB of the anchor side to the mobile station (MS) of the anchor side; transmitting an MS reception message from the TSB of the anchor side to the CE of the target side; transmitting an MS reception response message from the CE of the target side to the TSB of the anchor side; transmitting a hand-off completion message (HCM) from the mobile station of the anchor side to the TSB of the anchor side; and, transmitting a hand-off notice message from the TSB of the anchor side to the CCP of the target side.

In addition, there is provided a device for performing an IMSHO using a router in a CDMA communication system. The device comprises a router module allocated to each mobile switching center in the CDMA system, the router module for interfacing with a global communication interconnection network (GCIN); a base station subsystem (BSS) provided in each mobile switching center which is connected to the router module and includes the GCIN; a base station modulator connected to the GCIN in the BSS, for providing the link configuration information of the router module; and a trunk for connecting the router modules of different mobile switching centers to enable the communication between the base station subsystems belonging to the different mobile switching centers.

BRIEF DESCRIPTION OF THE DRAWINGS

The above and other objects, features and advantages of the present invention will become more apparent from the following detailed description in view of the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
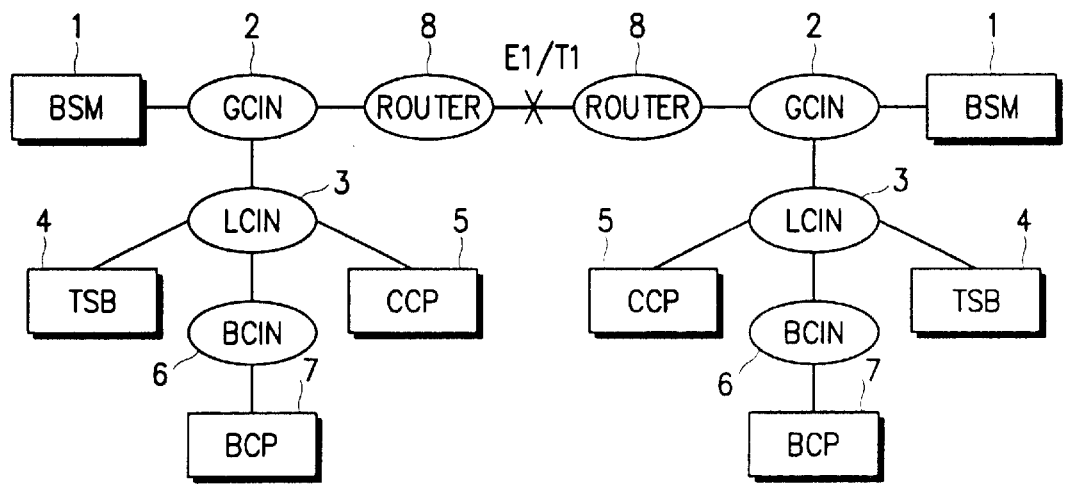
FIG. 1 is a diagram illustrating a network for an inter-MSC soft hand-off (IMSHO) applied to the present invention.

FIG. 1 illustrates a network for an inter-MSC soft hand-off (IMSHO) applied to the present invention. In FIG. 1, the two routers 8, which are interfaced with their respective global communication interconnection networks (GCINs), are provided to the existing CDMA network and connected to each other over a trunk, thus enabling the communication between two base station subsystems (BSSs) each belonging to a different mobile switching center (MSC). The BSS includes a global communication interconnection network (GCIN) 2, a local communication intercommunication network (LCIN) 3, a BTS (Base station Transceiver System) communication intercommunication network (BCIN) 6, a call control processor (CCP) 5, a BTS control processor (BCP) 7, and a transcoder & Selector Bank (TSB) 4. The two routers 8 are interfacing each other over an unchannelized E1 or T1 trunk.

Figure 2:
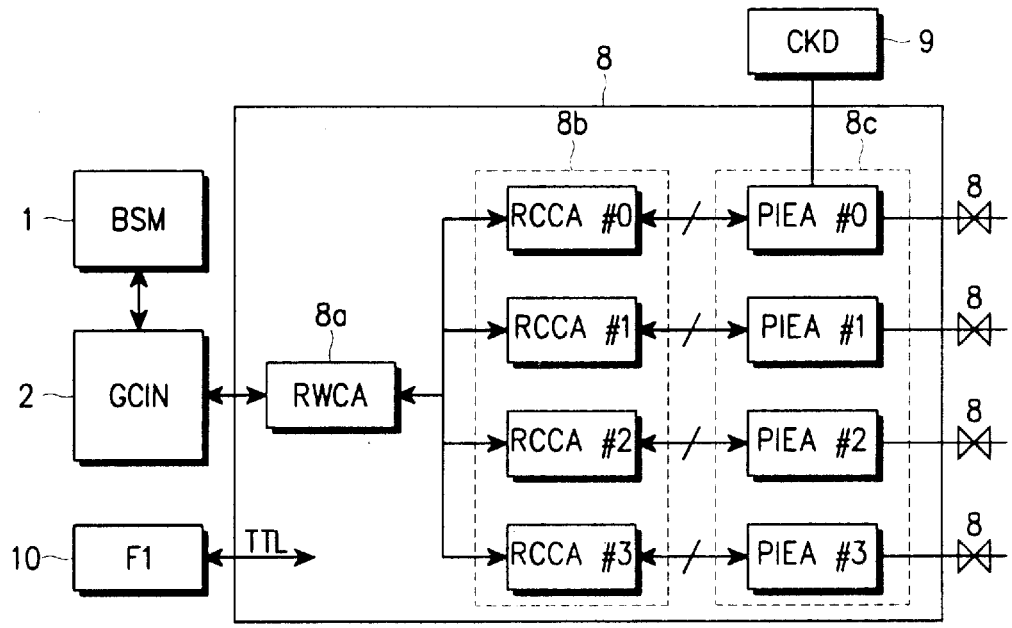
FIG. 2 is a block diagram illustrating the router in accordance with the present invention.

FIG. 2 illustrates a block diagram of the router in accordance with the present invention. As shown in FIG. 2, the router 8 includes a router main control board assembly (RMCA) 8a, a router channel card assembly (RCCA) 8b and a PCM interface E1 board assembly (PIEA) 8c. The RMCA 8a performs the U_link (RS-422) interfacing function, the high-level data link control formatting/deformatting function, and the packet routing function. The RCCA 8b performs the CRC (Cyclic Redundancy Check) function and the data transmission function. The PIEA 8c performs the trunk interfacing function and the clock processing function.

A multi-link communication path is provided between the routers 8, and each router examines in real time whether each path has an obstacle in relation to the other router, to transmit the packet data over the available link only. Each router can be interfaced with several other routers. The link configuration information for determining the router link among the routers is received from a base station modulator (BSM) 1. Using the link configuration information from the BSM, it is possible to perform the routing function of the packet data.

A description will be made of the data configuration and the management of the IMSHO. The link configuration connected between the routers 8 is divided into a network ID (identification) and a link ID. This link configuration information is managed as static data in the base station modulator (BSM) 1 and provided to a router 8 to perform the packet router function, and the configuration information is updated each time the router 8 is initialized.

Further, if a hand-off occurs between the two cells each belonging to a different network ID, the CCP 5 of the anchor side consults the neighbor data. If the hand-off type between the two cells is set so that the communication path is formed through the router 8 the CCP 5 performs the IMSHO process. By adding the hand-off type to the neighbor data, the CCP 5 determines whether to perform the IMSHO process or an IMHHO (Inter-MSC hard hand-off) process.

Meanwhile, the router 8 constantly monitors the state of the link to determine whether the link is available. When all the links connected to the router 8 of the other network are unavailable, this information is provided to the CCP 5 so that even though the hand-off type is set to the IMSHO the CCP 5 can perform the inter-MSC hard hand-off (IMHHO).

Figure 3:
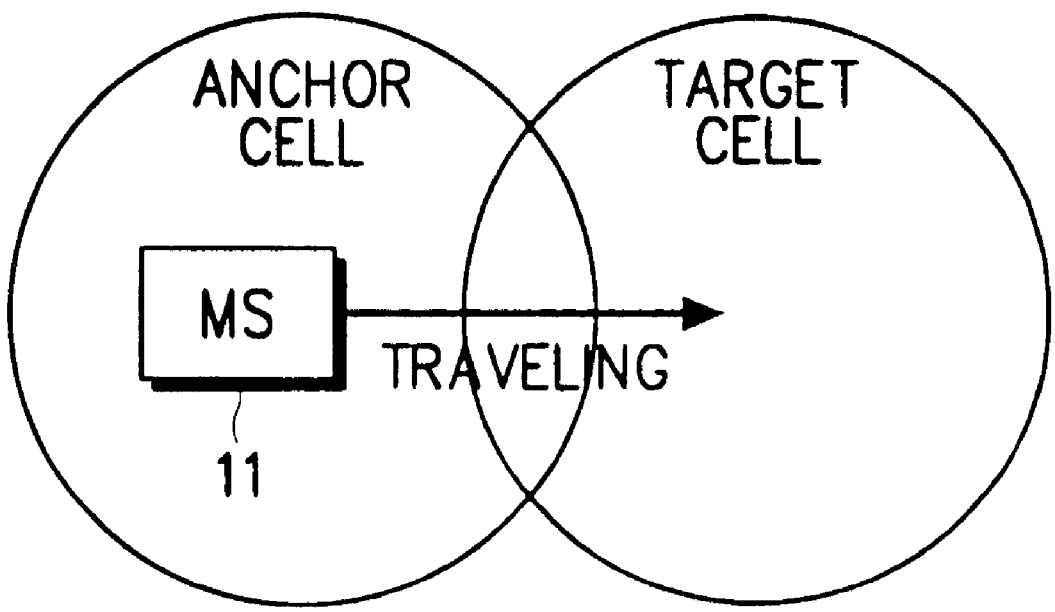
FIG. 3 is a diagram illustrating a state where a mobile station travels from the present anchor cell to the adjacent target cell; and, FIG. 4 is a flow diagram illustrating a procedure for performing the IMSHO function.

FIG. 3 shows a graph illustration where the mobile station 11 travels from the present anchor cell to the adjacent target cell, thus requiring the IMSHO. A description will be now made of the procedure for performing the IMSHO function with reference to FIG. 3. When the mobile station (MS) 11 travels to the adjacent cell during a call connection, a transcoding selector bank (TSB) 4 sends a hand-off request message to the CCP 5 depending on a pilot included in a candidate set, upon receipt of a pilot strength measurement message (PSMM). Upon the receipt of the hand-off request, the CCP 5 consults the neighbor list data to send an IMSHO request message to the CCP 5, if the adjacent cell is set to the IMSHO hand-off type and the link between the routers having the network ID of the target cell is available.

Upon the receipt of the IMSHO request message, the target CCP 5 sends the information about the traffic channel element (TCE) ID received from the target BCP 7 and the hand-off allocation information to the anchor CCP 5, which has requested the IMSHO hand-off. The anchor CCP 5 informs the anchor TSB 4 that the TCE of the target side is allocated, and the anchor TSB 4 performs the time sync process between the anchor TCE and the target TCE and then transmits a hand-off direction message (HDM) to the mobile station 11. Further, the anchor TSB 4 performs a mobile station acquisition process and then receives a hand-off completion message (HCM) from the mobile station, then provides the received HCM to the CCP 5 to complete the IMSHO process.

Figure 4:
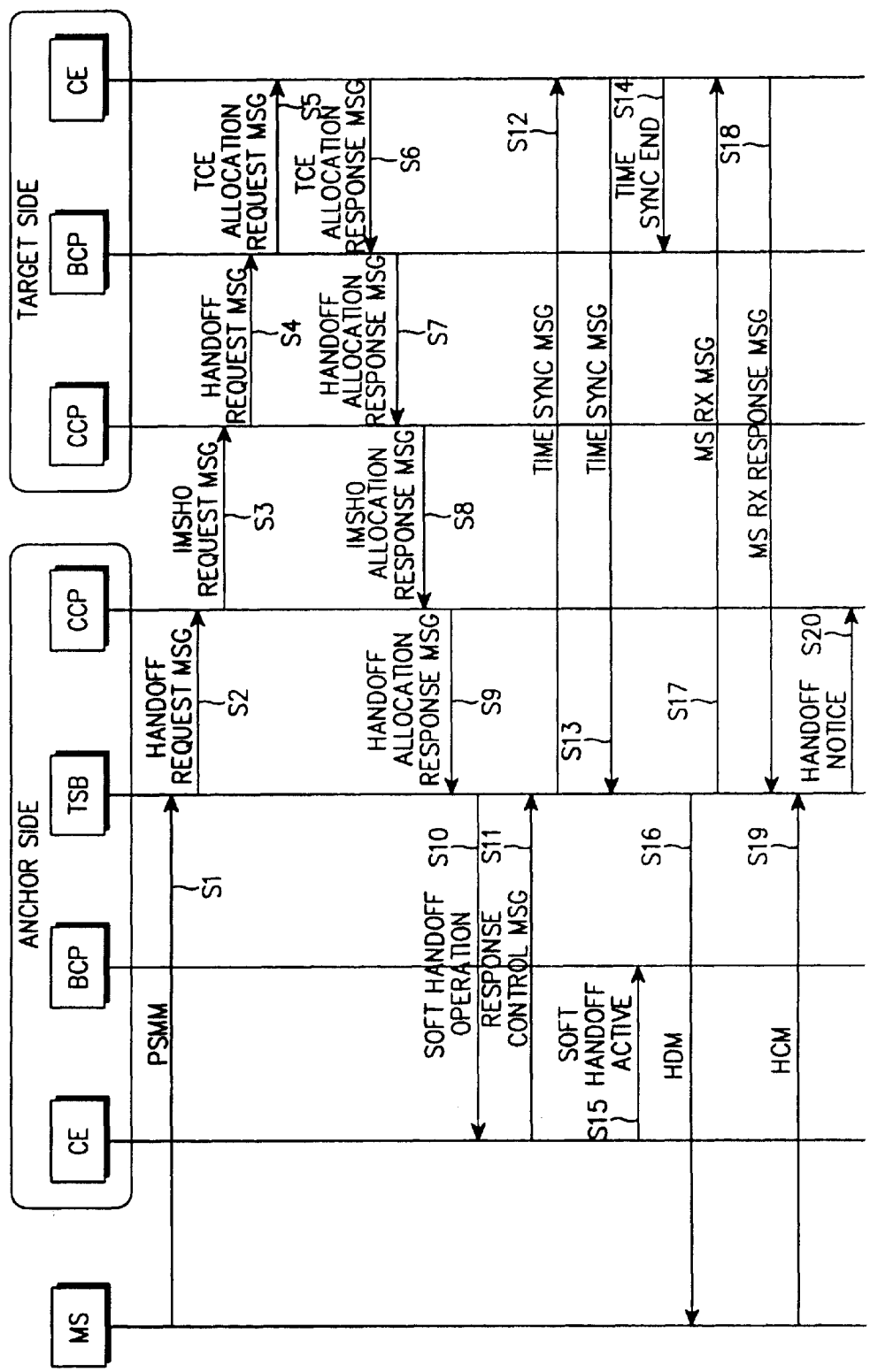

FIG. 4 shows a procedure for performing the IMSHO function in accordance with the present invention. As shown in FIG. 4, a mobile station (MS) of the anchor side transmits a "pilot strength measurement message" (PSMM) to a transcoder & selector bank (TSB) of the anchor side, in step s1. The TSB of the anchor side then transmits a "hand-off request message" to a call control processor (CCP) of the anchor side, in step s2. The CCP of the anchor side then transmits an "IMSHO request message" to a CCP of the target side, in step s3. The CCP of the target side then transmits the "hand-off request message" to a BTS control processor (BCP) of the target side, in step s4. The BCP of the target side then transmits a "TCE allocation request message" to a channel element (CE) of the target side, in step s5. The CE of the target side then transmits a "TCE allocation response message" to the BCP of the target side, in step s6. The BCP of the target side then transmits a "hand-off allocation response message" to the CCP of the target side, in step s7. The CCP of the target side then transmits an "IMSHO allocation response message" to the CCP of the anchor side, in step s8. The CCP of the anchor side then transmits a "hand-off allocation response message" to the TSB of the anchor side, in step s9. The TSB of the anchor side then transmits a "soft hand-off operation message" to the CE of the anchor side, in step s10. The CE of the anchor side then transmits a "response control message" to the TSB of the anchor side, in step s11. The TSB of the anchor side then transmits a "time sync message" to the CE of the target side in step s12. The CE of the target side transmits the "time sync message" to the TSB of the anchor side, in step s13. The CE of the target side then transmits a "time sync completion message" to the BCP of the target side, in step s14. The CE of the anchor side then transmits a "soft hand-off active message" to the BCP of the anchor side in step s15. The TSB of the anchor side then transmits a "hand-off direction message" (HDM) to the mobile station of the anchor side, in step s16. The TSB of the anchor side then transmits a "mobile station reception message" to the CE of the target side, in step s17. The CE of the target side transmits a "mobile station reception response message" to the TSB of the anchor side, in step s18. The mobile station of the anchor side then transmits a "hand-off completion message" (HCM) to the TSB of the anchor side, in step s19. The TSB of the anchor side then transmits a "hand-off notice message" to the CCP of the anchor side, in step s20.

As described above, the invention performs the soft hand-off between the cells each belonging to a different mobile switching center by using a router. Therefore, it is possible to maintain a stable call connection for a roaming mobile station, thus enhancing the service quality of the system.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for performing an inter-MSC (Mobile Switching Center) soft hand-off (IMSHO) using a router in a code division multiple access (CDMA) communication system, comprising the steps of:

(1) transmitting a pilot strength measurement message (PSMM) from a mobile station (MS) of an anchor side to a transcoder & selector bank (TSB) of the anchor side;

(2) transmitting a hand-off request message from the anchor TSB to a call control processor (CCP) of the anchor side;

(3) transmitting an IMSHO request message from the anchor CCP to a CCP of the target side;

(4) transmitting a hand-off request message from the target CCP to a BTS (Base station Transceiver System) control processor (BCP) of the target side;

(5) transmitting a TCE (Traffic Channel Element) allocation request message from the target BCP to a channel element (CE) of the target side;

(6) transmitting a TCE allocation response message from the target CE to the BCP of the target side;

(7) transmitting a hand-off allocation response message from the target BCP to the target CCP;

(8) transmitting an IMSHO allocation response message from the target CCP to the anchor CCP;

(9) transmitting a hand-off allocation response message from the anchor CCP to the anchor TSB;

(10) transmitting a soft hand-off operation message from the anchor TSB to a CE of the anchor side;

(11) transmitting a response control message from the anchor CE to the anchor TSB;

(12) transmitting a time sync message from the anchor TSB to the target CE;

(13) transmitting the time sync message from the target CE to the anchor TSB;

(14) transmitting a time sync completion message from the target CE to the target BCP;

(15) transmitting a soft hand-off active message from the anchor CE to the anchor BCP;

(16) transmitting a hand-off direction message (HDM) from the TSB of the anchor side to a mobile station (MS) of the anchor side;

(17) transmitting an MS reception message from the anchor TSB to the target CE;

(18) transmitting an MS reception response message from the target CE to the anchor TSB;

(19) transmitting a hand-off completion message (HCM) from the mobile station of the anchor side to the anchor TSB; and,

(20) transmitting a hand-off notice message from the anchor TSB to the target CCP.

2. The method as claimed in claim 1, wherein the step (3) further comprising the step of consulting a neighbor list data, upon receiving the hand-off request message, to transmit the IMSHO request message if a target cell is set to an IMSHO hand-off type and if a link of the router with a network identification (ID) of the target cell is available.

3. The method as claimed in claim 1, wherein the step (2) comprises transmitting the hand-off request message based on a pilot included in a candidate set.

4. The method as claimed in claim 3, wherein the step (3) further comprising the step of consulting a neighbor list data, upon receiving the hand-off request message, to transmit the IMSHO request message if a target cell is set to an IMSHO hand-off type and if a link of the router with a network identification (ID) of the target cell is available.

5. The method as claimed in claim 1, wherein the hand-off occurs when the mobile station travels from one cell area of one mobile switching center to another cell of another mobile switching center during a call.

6. The method as claimed in claim 5, wherein the hand-off is performed using a vocoder of the anchor side.

7. The method as claimed in claim 1, wherein the router is used for coupling the anchor vocoder and the target vocoder to execute the hand-off.

8. A system for performing an IMSHO using a router in a CDMA communication system, comprising:

a base station subsystem (BSS) having a local communication intercommunication network (LCIN) and a global communication interconnection network (GCIN) in communication with said LCIN, said BSS provided in each mobile switching center of said CDMA system;

a router module coupled to said each mobile switching center for interfacing said GCIN of said BSS;

a base station modulator (BSM) coupled to said GCIN of said BSS for providing a link configuration information of said router module;

a trunk for connecting said router module belong to said each mobile switching centers and for enabling a communication between said base station subsystem (BSS) of said respective mobile switching center;

call control processor means for preventing a hard hand-off between different networks in communication with said LCIN, said call control processor means includes means for receiving a hand-off request from a transcoding selector bank (TSB) from a different network and means for determining whether a hand-off made in response to the hand-off request is to be performed by a soft (IMSHO) or hard (IMHHO) process by verifying that a link between said networks is available to check an indicated hand-off type in a neighboring network data.

9. The system as claimed in claim 8, wherein said router module comprises:

a router main control board assembly (RMCA) for performing a GCIN interfacing function, a high level data link control (HDLC) formatting/deformatting function, and a packet routing function;

a plurality of router channel card assemblies (RCCA) coupled to said RMCA for performing a CRC (Cyclic Redundancy Check) function and a data transmission function; and a PCM interface E1 board assembly (PIEA) coupled to said plurality of said RCCA for performing a trunk interfacing function and a clock processing function.

10. The system as claimed in claim 9, wherein said router module is interfaced with another router module on a one-to-one basis.

11. The system as claimed in claim 10, wherein a multi-link communication path is provided between said router modules.

12. The system as claimed in claim 9, wherein said router module is interfaced with a plurality of other router modules.

13. The system as claimed in claim 12, wherein a multi-link communication path is provided between said router modules.

14. The system as claimed in claim 13, wherein said trunk is a unchannelized E1 or T1 interfacing trunk.

15. The system as claimed in claim 14, wherein said base station subsystem comprises:

said GCIN; and, a BTS communication interconnection network (BCIN) coupled to said LCIN.

16. The system as claimed in claim 8, wherein the call control processing means continuously monitors the link between said different networks and even after verifying neighboring data indicating a soft hand-off request (IMSHO), the call control processing means performs a hard hand-off (IMHHO) if the link becomes unavailable.

* * * * *